US012768931B2

(12) United States Patent
Zhao et al.

(10) Patent No.: US 12,768,931 B2
(45) Date of Patent: Oct. 20, 2026

(54) ULTRA-WIDEBAND LOCALIZATION

(71) Applicant: The Regents of the University of California, Oakland, CA (US)

(72) Inventors: Minghui Zhao, New York, NY (US); Sai Roshan Ayyalasomayajula, San Diego, CA (US); Chi Zhang, San Diego, CA (US); Dinesh Bharadia, San Diego, CA (US); Aditya Arun, San Jose, CA (US); Tyler Chang, Rancho Palos Verdes, CA (US)

(73) Assignee: The Regents at the University of California, Oakland, CA (US)

( * ) Notice: Subject to any disclaimer, the term of this patent is extended or adjusted under 35 U.S.C. 154(b) by 296 days.

(21) Appl. No.: 18/257,568

(22) PCT Filed: Dec. 22, 2021

(86) PCT No.: PCT/US2021/064984
§ 371 (c)(1),
(2) Date: Jun. 14, 2023

(87) PCT Pub. No.: WO2022/140623
PCT Pub. Date: Jun. 30, 2022

(65) Prior Publication Data

US 2024/0118367 A1 Apr. 11, 2024

Related U.S. Application Data

(60) Provisional application No. 63/129,059, filed on Dec. 22, 2020.

(51) Int. Cl.

| | |
|---|---|
| ***G01S 5/02*** | (2010.01) |
| ***G01S 5/04*** | (2006.01) |
| ***G01S 13/76*** | (2006.01) |

(52) U.S. Cl.
CPC ............ *G01S 5/02216* (2020.05); *G01S 5/04* (2013.01); *G01S 13/765* (2013.01)

(58) Field of Classification Search
CPC ...... G01S 5/02216; G01S 5/04; G01S 13/765; G01S 5/20; G01S 3/46
See application file for complete search history.

(56) References Cited

U.S. PATENT DOCUMENTS

2017/0005958 A1* 1/2017 Frenkel ................ G01S 5/0242
2019/0361111 A1 11/2019 Sadiq et al.
(Continued)

OTHER PUBLICATIONS

AirFinder, (Available via Wayback Machine—https://www.airfinder.com/).
(Continued)

*Primary Examiner* — Resha Desai
*Assistant Examiner* — Naomi M Wolford
(74) *Attorney, Agent, or Firm* — FisherBroyles, LLP

(57) ABSTRACT

A method, a system, an apparatus, and a computer program product for determining a location of a wireless device. One or more second wireless devices in a plurality of second wireless devices are configured for processing one or more communications exchanged with a first wireless device in a plurality of first wireless devices to determine a location of the first wireless device in an environment. One or more communications are processed using one or more second wireless devices. The location of the first wireless device in the environment is determined based on the processed one or more communications.

17 Claims, 13 Drawing Sheets

(56) References Cited

U.S. PATENT DOCUMENTS

| | | | | |
|---|---|---|---|---|
| 2020/0202048 | A1* | 6/2020 | Santarone | G06T 17/05 |
| 2020/0209372 | A1* | 7/2020 | Seth | G01S 5/0284 |
| 2021/0400427 | A1* | 12/2021 | Burowski | H04W 74/0808 |

OTHER PUBLICATIONS

Amazon Go, (Available at http://web.archive.org/web/20200226105426/https://www.amazon.com/b?node=20931388011).
Bosch, Laser Measure DLE40 professional, (Available at https://usermanual.wiki/m/b84c6235e4f9225bdfec3dd23f40b6b923814f22528a4f22fe99c88ad650a5da.pdf).
Decawave Antenna Datasheet, (Available at https://www.decawave.com/sites/defaultfiles/resources/DWM1000-Datasheet-V1.6.pdf).
Eliko, (Available at https://www.eliko.ee/products/kio-rtls/).
Google Stadia, (Available via Wayback Machine—https://store.google.com/us/product/stadia).
Humatics, (Available at https://timedomain.com/industries/research-and-education/scholar-ranging-localization/).
Indoorway, (Available at https://www.indoorway.com/).
Infsoft, (Available at https://www.infsoft.com/technology/positioning-technologies/ultra-wideband).
Locatify, (Available at https://locatify.com/).
Marvelmind, (Available at https://marvelmind.com/).
Packet39, 6 DoF VR headset, (Available at https://packet39.com/blog/2018/02/25/3dof-6dof-roomscale-vr-360-video-and-everything-in-between/).
Pozyx, (Available at pozyx.io).
Tesla, (Available at https://www.tesla.com/impact-report/2019).
Track 160, (Available at https://track160.com/).
Ubisense, (Available at https://ubisense.com/sensor-systems/).
Vive, (Available at https://www.vive.com/us/product/4cosmos%20series).
Alarifi, A. et al., "Ultra Wideband Indoor Positioning Technologies: Analysis and Recent Advances," Sensors, 16(5):707, 2016.
Arndt, G. D. et al., "Ultra-Wideband Angle-of-Arrival Tracking Systems," No. MSC-24184-1, 2010.
Ayyalasomayajula, R. et al., "BLoc: CSI-based Accurate Localization for BLE Tags," In Proceedings of the 14th International Conference on emerging Networking Experiments and Technologies, pp. 126-138, 2018.
Ayyalasomayajula, R. et al., "Deep Learning based Wireless Localization for Indoor Navigation," In Proceedings of the 26th Annual International Conference on Mobile Computing and Networking, pp. 1-14, 2020.
Bonin-Pascual, F. et al., "An UWB-based System for Localization Inside Merchant Vessels," In 2019 24th JEFF International Conference on Emerging Technologies and Factory Automation (ETFA), pp. 1559-1562. IEEE, 2019.
Dotlic, L. et al., "Angle of Arrival Estimation Using Decawave DW1000 Integrated Circuits," In 2017 14th Workshop on Positioning, Navigation and Communications (WPNC), pp. 1-6. IEEE, 2017.
Garcia, E. et al., "A Robust UWB Indoor Positioning System for Highly Complex Environments," In 2015 IEEE International Conference on Industrial Technology (ICIT), pp. 3386-3391. IEEE, 2015.
Garcia, E. et al., "DS-UWB indoor positioning system implementation based on FPGAs," Sensors and Actuators A: Physical 201:172-181, 2013.
Gerok, W. et al., "Influence of the Real UWB Antennas on the AOA Estimation Based on the TDOA Localization Technique," In JEFF Middle East Conference on Antennas and Propagation (MECAP 2010), pp. 1-6. IEEE, 2010.
Gjengset, J. et al., "Phaser: Enabling Phased Array Signal Processing on Commodity Wi-Fi Access Points," MobiCom, 2014.
Guvenc, L. et al., "NLOS Identification and Mitigation for UWB Localization Systems," In 2007 JEFF Wireless Communications and Networking Conference, pp. 1571-1576. IEEE, 2007.
Iwakiri, N. et al., "Ultra-Wideband Time-of-Arrival and Angle-of-Arrival Estimation Using Transformation Between Frequency and Time Domain Signals," Journal of Communications, 3(1):12-19, 2008.
Joshi, K. et al., "PinPoint: Localizing Interfering Radios," NSDI, pp. 241-253, 2013.
Karapistoli, E. et al., "An Overview of the IEEE 802.15.4a Standard," IEEE Communications Magazine, 48(1):47-53, 2010.
Kempke, et al., "Harmonium: Asymmetric, Bandstitched UWB for Fast, Accurate, and Robust Indoor Localization," In 2016 15th ACM/IEEE International Conference on Information Processing in Sensor Networks (IPSN), pp. 1-12. IEEE, 2016.
Kotaru, M. et al., "Position tracking for virtual reality using commodity Wi-Fi," In Proceedings of the JEFF Conference on Computer Vision and Pattern Recognition, pp. 68-78, 2017.
Kotaru, M. et al., "SpotFi: Decimeter Level Localization Using WiFi," SIGCOMM, pp. 269-282, 2015.
Krishnan, S. et al., "A UWB based Localization System for Indoor Robot Navigation," In 2007 IEEE International Conference on Ultra-Wideband, pp. 77-82. IEEE, 2007.
Kuhn, M. et al., "High accuracy UWB localization in dense indoor environments," In 2008 IEEE International Conference on Ultra-Wideband, vol. 2, pp. 129-132. IEEE, 2008.
Kumar, S. et al., "Accurate Indoor Localization with Zero Start-up Cost," MobiCom, pp. 483-494, 2014.
Ledergerber, A. et al., "Ultra-Wideband Angle of Arrival Estimation Based on Angle-Dependent Antenna Transfer Function," Sensors, 19(20):4466, 2019.
Lee, Y. U., "Weighted-average based aoa parameter estimations for lr-uwb wireless positioning system," IEICE transactions on communications, 94(12):3599-3602, 2011. [English Abst.].
Luo, Y. et al., "Angle-of-arrival estimation with array in a Line-of-Sight indoor UWB-IR," In 2009 7th International Conference on Information, Communications and Signal Processing (ICICS), pp. 1-5. IEEE, 2009.
Ma, Y. et al., "Drone Relays for Battery-Free Networks," In SIGCOMM, 2017.
Mayer, H. et al., "Haptic Feedback in a Telepresence System for Endoscopic Heart Surgery," Presence: Teleoperators and Virtual Environments, 16(5):459-470, 2007.
Nandalamiar, R. et al., "3D Localization for Sub-Centimeter Sized Devices," In Proceedings of the 16th ACM Conference on Embedded Networked Sensor Systems, pp. 108-119, 2018.
Pasya, I. et al., "Joint direction-of-departure and direction-of-arrival estimation in an ultra-wideband MIMO radar system." 2014 IEEE Radio and Wireless Symposium (RWS). IEEE, 2014.
Sen, S. et al., "You are facing the Mona Lisa: Spot localization using phy layer information," In Proceedings of the 10th international conference on Mobile systems, applications, and services, pp. 183-196. ACM, 2012.
Soltanaghaei, E. et al., "Multipath Triangulation: Decimeter-level WiFi Localization and Orientation with a Single Unaided Receiver," In MobiSyS, pp. 376-388, 2018.
Subramanian, A., "UWB Linear Quadratic Frequency Domain Frequency Invariant Beamforming and Angle of Arrival Estimation," In 2007 IEEE 65th Vehicular Technology Conference—VTC2007—Spring, pp. 614-618. IEEE, 2007.
Talla, V. et al., "LoRa Backscatter: Enabling The Vision of Ubiquitous Connectivity," Proceedings of the ACM on interactive, mobile, wearable and ubiquitous technologies 1.3 (2017): 1-24.
Tranter, W. H. et al., "Principles of communication systems simulation with wireless applications, volume 1," Prentice Hall New Jersey, 2004.
Tse, D. et al., "Fundamentals of wireless communication," Cambridge University press, 2005.
Vanderveen, M. C. et al., "Joint angle and delay estimation (JADE) for multipath signals arriving at an antenna array," IEEE Communications letters, 1(1):12-14, 1997.
Vasisht, D. et al., "Decimeter-Level Localization with a Single WiFi Access Point," NSDI, pp. 165-178, 2016.

(56) References Cited

OTHER PUBLICATIONS

Wang, J. et al., "Dude, Where's My Card? RFID Positioning That Works with Multipath and Non-line of Sight," Proceedings of the ACM SIGCOMM 2013 conference on SIGCOMM, pp. 51-62, 2013.
Wang, J. et al., "RF-IDraw: Virtual Touch Screen in the Air Using RF Signals," ACM SIGCOMM Computer Communication Review, 44(4):235-246, 2014.
Xiong, J. et al., "ArrayTrack: A Fine-grained Indoor Location System," NSDI, pp. 71-84, 2013.
Xiong, J. et al., "Synchronicity: Pushing the Envelope of Fine-Grained Localization with Distributed Mimo," In HotWireless, pp. 43-47, 2014.
Xiong, J. et al., "ToneTrack: Leveraging Frequency-Agile Radios for Time-Based Indoor Wireless Localization," MobiCom, pp. 537-549, 2015.
Xu, J. et al., "AOA Cooperative Position Localization," In IEEE GLOBECOM 2008-2008 IEEE Global Telecommunications Conference, pp. 1-5. IEEE, 2008.
Yang, L. et al., "Tagoram: Real-time tracking of mobile RFID tags to high precision using cots devices," MobiCom, 2014.
Zwirello, L. et al., "UWB Localization System for Indoor Applications: Concept, Realization and Analysis," Journal of Electrical and Computer Engineering, 2012.

* cited by examiner

FIG. 7

| | TWR based (702) | TWR + AoA (704) | Concurrent Ranging (706) | Concurrent AoA (708) | System 100 (710) |
|---|---|---|---|---|---|
| Accuracy | 10s of cm (3D) | 10s of cm (2D) | cm-accurate (2D) | 10s of cm (2D) | cm-accurate (3D) |
| Tag Est. Battery Life | 3.1 months | 7.6 months<br>6.3 months | 4.0 months | 4.0 months | 2.4 years |
| Infra. Driven | Yes | No | No | No | Yes |
| Latency | Very High | Medium | High | High | Low (1msec) |

ULTRA-WIDEBAND LOCALIZATION

CROSS-REFERENCE TO RELATED APPLICATIONS

This application is a national stage entry of Patent Cooperation Treaty Application No. PCT/US2021/064984 filed Dec. 22, 2021, entitled "ULTRA-WIDEBAND LOCALIZATION," which claims priority to U.S. Provisional application Ser. No. 63/129,059 filed Dec. 22, 2020, entitled "ROBUST, SCALABLE AND ACCURATE ULTRA-WIDEBAND TAG LOCALIZATION," the disclosures of which are incorporated herein by reference in their entirety.

TECHNICAL FIELD

The current subject matter generally relates to data processing, and in particular, determination of location of wireless devices, tags, and/or any other communication devices using ultra-wideband techniques.

BACKGROUND

A significant number of communications devices operate in today's communications systems. Various wireless communication protocols have been developed for determining location (i.e., localization) of such devices. These include WiFi protocols, satellite-based signaling, long term evolution (LTE) systems protocols, passive radio frequency identification (RFID) methods, active RFID methods, Bluetooth® and other protocols. However, conventional location determination systems are not able to accurately determine location of wireless devices. They also suffer from high latency and consume significant amounts of power.

SUMMARY

In some implementations, the current subject matter relates to a computer-implemented method for determining a location of a wireless devices. The method may include configuring one or more second wireless devices in a plurality of second wireless devices for processing one or more communications exchanged with a first wireless device in a plurality of first wireless devices to determine a location of the first wireless device in an environment, processing, using the one or more second wireless devices, the one or more communications, and determining, based on the processed one or more communications, the location of the first wireless device in the environment.

In some implementations, the current subject matter may include one or more of the following optional features. The communications may include at least one of: a received communication, a transmitted communication, and any combination thereof by at least one of: the first wireless device, one or more second wireless devices, and any combination thereof. Further, the communications may include a communication responsive to at least one of: the received communication, the transmitted communication, and any combination thereof. Additionally, the communications may include a signal transmission. Moreover, as stated above, the processing of the communications may include determining, based on the signal transmission, an angle of arrival of the signal transmission, and determining, using the determined angle of arrival of the signal transmission, the location of the first wireless device in the environment.

The signal transmission may be received using one or more second wireless devices in a plurality of second wireless devices. Each second wireless device in the plurality of second wireless devices may include one or more antennas (e.g., antennas may include transceivers) configured to receive the signal transmission from the first wireless device and/or transmit at least another signal to the first wireless device.

In some implementations, each antenna may be configured to be synchronized using at least one clock reference signal. The clock reference signals may be generated using at least one processor of a second wireless device in the plurality of wireless devices receiving the signal transmission.

In some implementations, each antenna may be configured to be positioned a predetermined distance from another antenna in the one or more antennas. Further, each antenna may be configured to be oriented in a predetermined direction.

In some implementations, the antennas of each second wireless device in the plurality of second wireless devices may be configured to be synchronized using at least one of the following parameters: a time, a frequency, a phase, and any combination thereof.

In some implementations, at least one of the first and second wireless devices may be configured to be ultra-wideband wireless devices. The signal transmission may be an ultra-wideband signal transmission. In some implementations, the signal transmission may include a blink transmission.

In some implementations, the determining of the angle of arrival of the signal transmission may include estimating at least one of an azimuth angle of arrival and a polar angle of arrival for each antenna, combining estimated azimuth angles of arrival and polar angles of arrival for one or more antennas, and determining, based on the combined estimates of azimuth angles of arrival and polar angles of arrival for one or more antennas, an actual angle of arrival of the signal transmission.

In some implementations, the determining the actual angle of arrival of the signal transmission may be performed in real-time. The determined location of the first wireless device in the environment may correspond to the location of the first wireless device in a multi-dimensional space at a predetermined point in time.

In some implementations, the first wireless device may include at least one of a stationary first wireless device, a moving wireless device, and any combination thereof.

In some implementations, the determination of the location of the first wireless devices may include determining the location of the first wireless device using a single second wireless device in the plurality of second wireless devices by executing a two-way-ranging communication protocol at one or more antennas of the single second wireless device. Further, the determination of the location of the first wireless device may include determining the location of the first wireless device using at least one of the following: at least one of one or more azimuth angles, one or more polar angles, and any combination thereof associated with the signal transmission received by at least two or more of the second wireless devices in the plurality of second wireless devices; at least one of one or more azimuth angles, one or more polar angles, one or more values resulting from execution of the two-way-ranging communication protocol, and any combination thereof by at least one or more of the second wireless devices in the plurality of second wireless devices; and any combination thereof.

In some implementations, the current subject matter relates to an apparatus (e.g., for determination of a location of a wireless device (e.g., tag)). The apparatus may include one or more antennas configured to be positioned a predetermined distance from at least another antenna in the one or more antennas, one or more transceivers communicatively coupled to one or more antennas, and at least one processing device communicatively coupled to one or more transceivers. The processing devices may be configured to process one or more communications received by one or more transceivers, and determine a location of at least one wireless device in an environment based on one or more processed communications.

In some implementations, the current subject matter may include one or more of the following optional features. One or more communications may include a signal transmission. The processing devices may be configured to determine, based on the signal transmission, an angle of arrival of the signal transmission, and determine, using the determined angle of arrival of the signal transmission, the location of the wireless device in the environment. One or more antennas may be configured to receive the signal transmission from the wireless device and/or transmit at least another signal to the wireless device.

In some implementations, each antenna may be configured to be synchronized using at most one clock reference signal, the clock reference signal being generated by the at least one processing device. Each antenna may be further configured to be oriented in a predetermined direction. One or more antennas may be configured to be synchronized using at least one of the following parameters: a time, a frequency, a phase, and any combination thereof.

In some implementations, the signal transmission is an ultra-wideband signal transmission. Moreover, the signal transmission may include a blink transmission.

In some implementations, at least one processing device may determine the angle of arrival of the signal transmission by estimating at least one of an azimuth angle of arrival and a polar angle of arrival for each antenna, combining estimated azimuth angles of arrival and polar angles of arrival for one or more antennas, and determining, based on the combined estimates of azimuth angles of arrival and polar angles of arrival for one or more antennas, an actual angle of arrival of the signal transmission. Further, the determination of the actual angle of arrival of the signal transmission may be performed in real-time. The determined location of the wireless device in the environment may correspond to the location of the wireless device in a multi-dimensional space at a predetermined point in time.

In some implementations, the wireless device may include at least one of: a stationary wireless device, a moving wireless device, and any combination thereof.

In some implementations, the determination of the location of the wireless device may include executing a two-way-ranging communication protocol at one or more antennas. Further, the determination of the location of the wireless device may include determining the location of the wireless device using at least one of the following: at least one of one or more azimuth angles, one or more polar angles, and any combination thereof associated with the signal transmission; at least one of one or more azimuth angles, one or more polar angles, one or more values resulting from execution of the two-way-ranging communication protocol, and any combination thereof, and any combination thereof.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to optical edge detection, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 illustrates an exemplary performance comparison table comparing performances of conventional systems to the performance of the current subject matter system shown in FIG. 1;

DETAILED DESCRIPTION

Figure 1:
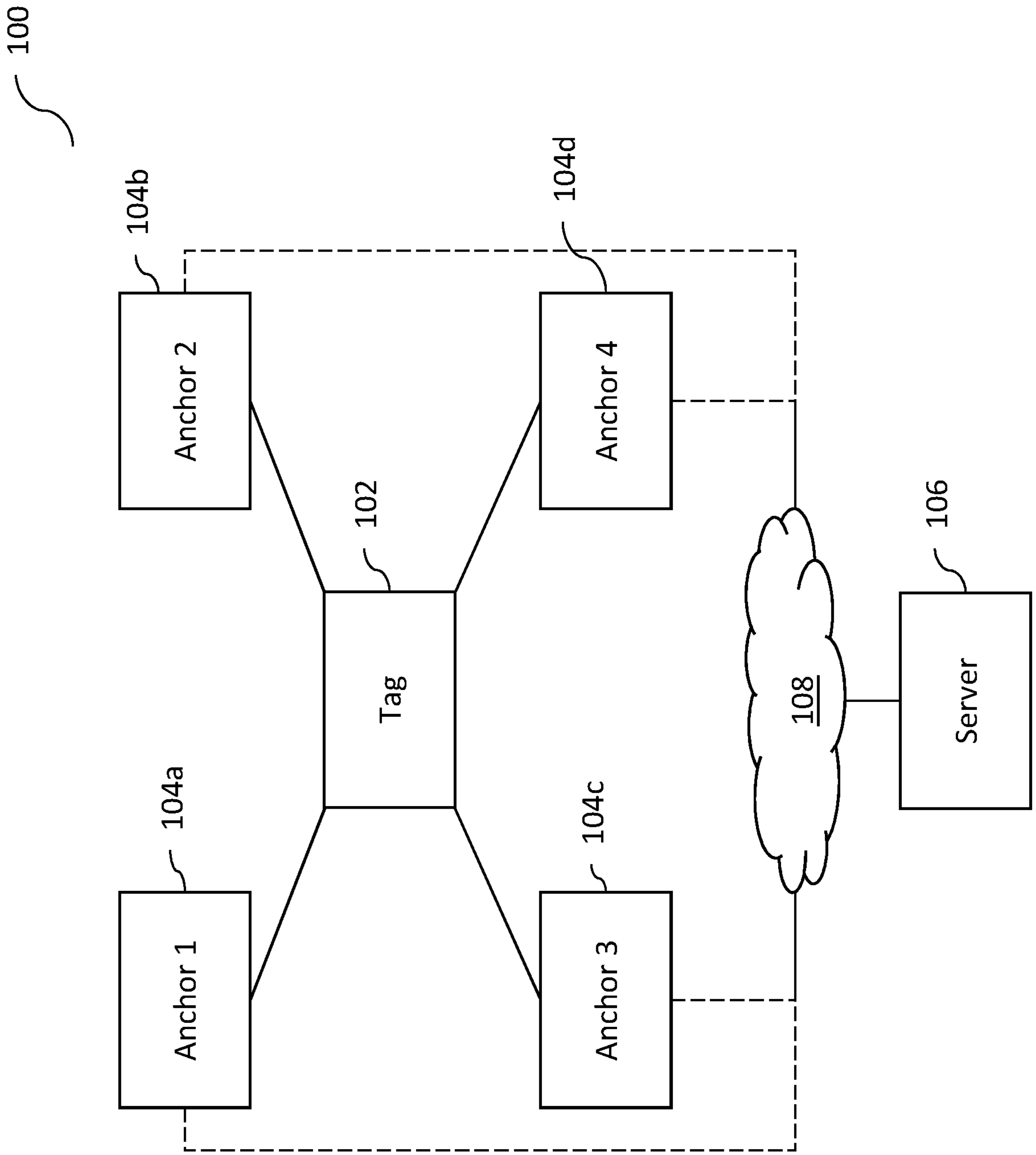
FIG. 1 illustrates an exemplary system 100 for determining location of one or more wireless devices, according to some implementations of the current subject matter.

One or more implementations of the current subject matter relate to methods, systems, articles of manufacture, and the like that may, among other possible advantages, provide determination of a location of a wireless device or a tag.

A myriad of applications, ranging from virtual reality/augmented reality (VR/AR) gaming to mission critical robotic surgery based applications demand centimeter (cm)-accurate localization of sensors, that are robust to blockages from hands and/or other obstacles in the environment. With this need, in the recent past, localization including ultra-wideband (UWB) based localization has become popular, because of its ability to achieve mm-accurate localization and pass through obstacles owing to its large bandwidth and larger wavelength, respectively. However, UWB based localization has not been scalable because of the fine-time-measurement based localization algorithms that have linearly increasing latency with increasing number of wireless devices (may also be referred to as tags) and readers in the environment.

In some implementations, the current subject matter relates to a scalable, robust, and cm-accurate UWB localization system. The current subject matter system may be configured to include a multi-antenna UWB board that may be configured to enable a multi-dimensional (e.g., two-dimensional (2D)) angle of arrival (AoA) measurements at each board. This may be configured to reduce the latency of the system (e.g., by a minimum of at least 10 times) and make UWB based localization scalable. Further, the current subject matter may be configured to execute a 2D AoA based 3D localization process to achieve a high localization accuracy (e.g., approximately 10 cm or less).

Accurate localization of wireless devices is important for many modern day applications, e.g., gaming, VR, sports analytic applications, inventory and personnel tracking, industrial Internet-of-things (IoT) applications, and many others. Conventional modem localization system demand robust, scalable, and low-latency performance of either the user's hand location (e.g., gaming, such as playing virtual tennis with a controller capturing hand-location, which requires location of hand and its motion to be captured in a low-latency fashion) and/or the robotic arm location (e.g., industrial automation). In industrial IoT applications (e.g., manufacturing and/or warehousing automation applications where robots need a real-time feedback at 1 KHz rate of the movement of arms to enable accurate maneuvering) require latency that should not increase with increasing number of sensors to be located in addition to preserving battery life of sensors. Further, loss of localization should not be tolerated because of blockage of line of sight (LOS) to the sensors.

To enable various applications, such as those discussed above, along with the localization capability in devices, the current subject matter may be configured to meet one or more (or all) of the following characteristics: a low latency and/or a real-time estimation characteristic, an infrastructure-aware characteristic, a long operation lifetime characteristic, and a multi-dimensional (e.g., 3D) accuracy characteristic, and/or any combination thereof. With regard to the low-latency and/or real-time estimation characteristic, many industrial and/or commercial applications may require location estimates of UWB tags to be acquired in real-time with a location update rate of up to a few 100's of Hz to ensure time-critical and/or safety decisions. For example, an automated robotic arm in an industrial setting that loads and unloads the inventory in close vicinity of a worker may be dependent on such accurate location estimation. The current subject matter's localization system may be configured to obtain an estimate of both the robotic arm and the worker in real-time to avoid any crashes and/or injuries. Conventional systems/algorithms (e.g., two-way ranging (TWR) based UWB localization systems) are not able to perform this estimation in real-time to meet the time-critical and/or safety requirements for these applications.

With regard to infrastructure-aware characteristic, the current subject matter may be configured to locate multiple wireless devices (e.g., tags) for inventory and/or personnel analytics and management (e.g., in industrial, construction, hospital, warehousing, etc. settings). This allows, for example, avoidance of collisions, accidents, etc. in industrial settings (e.g., using the current subject matter system, the machinery knows the position of all equipment and personnel). Existing systems suffer from poor latency as well as require multiple transmissions among various devices to determine location of tags, thereby lacking a real-time aspect of the system and increasing amount of traffic and power consumption across many devices.

The long operation lifetime characteristic (e.g., low power consumption) may enable long-battery based operation lifetime of tags. By contrast, conventional systems consume significant amounts of power and are not capable of prolonged operation.

The multi-dimensional (e.g., 3D) accuracy characteristic may enable the current subject matter system to accurately track the UWB tags to centimeter-grade accuracy in multiple dimensions (e.g., 3D) to avoid causing damage and/or crashes, for example, in the industrial settings. Existing system produce large localization errors (and may be limited to 2D), especially, in non-line of sight (NLoS) cases.

In some implementations, the current subject matter may be configured to include an ultra-wideband (UWB) based multi-dimensional (e.g., 3D) system that may be configured to achieve low-power, real-time, and cm-accurate tracking of wireless devices (e.g., tags). The current subject matter system may be configured to include one or more wireless devices (e.g., tags), one or more anchor devices, and/or one or more server and/or processor components. The tag(s) and the anchor(s) devices may be configured to communicate with one another to determine tag's location, movement direction, speed, etc., and/or any other parameters. The anchor(s) may be configured to communicate with one or more servers/processors to for the purposes of transmitting/receiving various information that may be relevant to a particular application setting (e.g., industrial warehouse, hospital, gaming, etc.).

One or more tags in the current subject matter system may be configured to achieve a low-power by offloading various communication and/or processing complexities from the tag to the infrastructure (e.g., anchor(s), server(s), etc.) and, in the process, making tag location available to the infrastructure. The anchor(s) may also be configured to offload communication/processing complexities to the infrastructure (e.g., server(s), processor(s), etc.), that may also enable providing tag's cm-accurate 3D location in real-time using a single transmission from the tag.

FIG. 1 illustrates an exemplary system 100 for determining location of one or more wireless devices, according to some implementations of the current subject matter. The system 100 may be configured to include one or more wireless devices and/or tags 102 and one or more wireless anchor devices 104 (a, b, c, d). Optionally, the system may include one or more servers 106 that may be communicatively coupled to one or more anchors 104 via a network 108.

Further, the system 100 may be configured to include one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

As shown in FIG. 1, the tag 102 may be configured to wireless communicate with one or more anchor devices 104. The tag 102 may be configured to be positioned on another object (e.g., human and/or not human). The anchor devices may be positioned on various surfaces (e.g., a wall in a warehouse, a gaming computing device, a hospital room, etc.). The tag 102 may be configured to communicate with one or more anchor device(s) 104. In some implementations, one or more tags 102 and one or more anchor devices 104 may be configured to communicate with one another and may be configured to receive and/or transmit one or more communications from one another (e.g., a (or one or more) tag 102 may transmit (e.g., broadcast) a communication to one or more anchor devices 104; an (or one or more) anchor device 104 may transmit a communication to one or more tags 102; tag(s) 102 and/or anchor device(s) 104 may be configured to respond to a communication from another tag 102 and/or device 104). The anchor devices 104 may be configured to determine presence of the tag 102, its heading direction, its location, and/or any other information that may be stored in the tag 102's memory. The tag's information may be determined using a single communication and/or multiple communications between the tag and one or more anchor devices.

In some implementations, to enable low-power and/or low-latency communications between the tag 102 and the anchor(s) 104, the tag 102 may be configured to consume as little power as possible and all complexity associated with communications, processing, etc. of signals may be positioned on the anchor 104 (rather than the tag 102). For this purpose, one or more anchors 104 may be configured to locate the tag accurately using a single broadcast transmission (e.g., "blink" transmission) from the tag 102. The broadcast transmission from the tag 102 may be received by all of the anchor(s) 104 of the system 100 that may then enable determination of the tag's location. Thus, the current subject matter may be configured to determination location (in multiple dimensions, e.g., 3D) of a tag 102 in real-time using a single transmission (as compared to using a 12 packet exchange in conventional systems). Further, use of a single transmission and avoiding any compute requirements on the tag 102 also significantly reduces consumption of power.

Figure 2A:
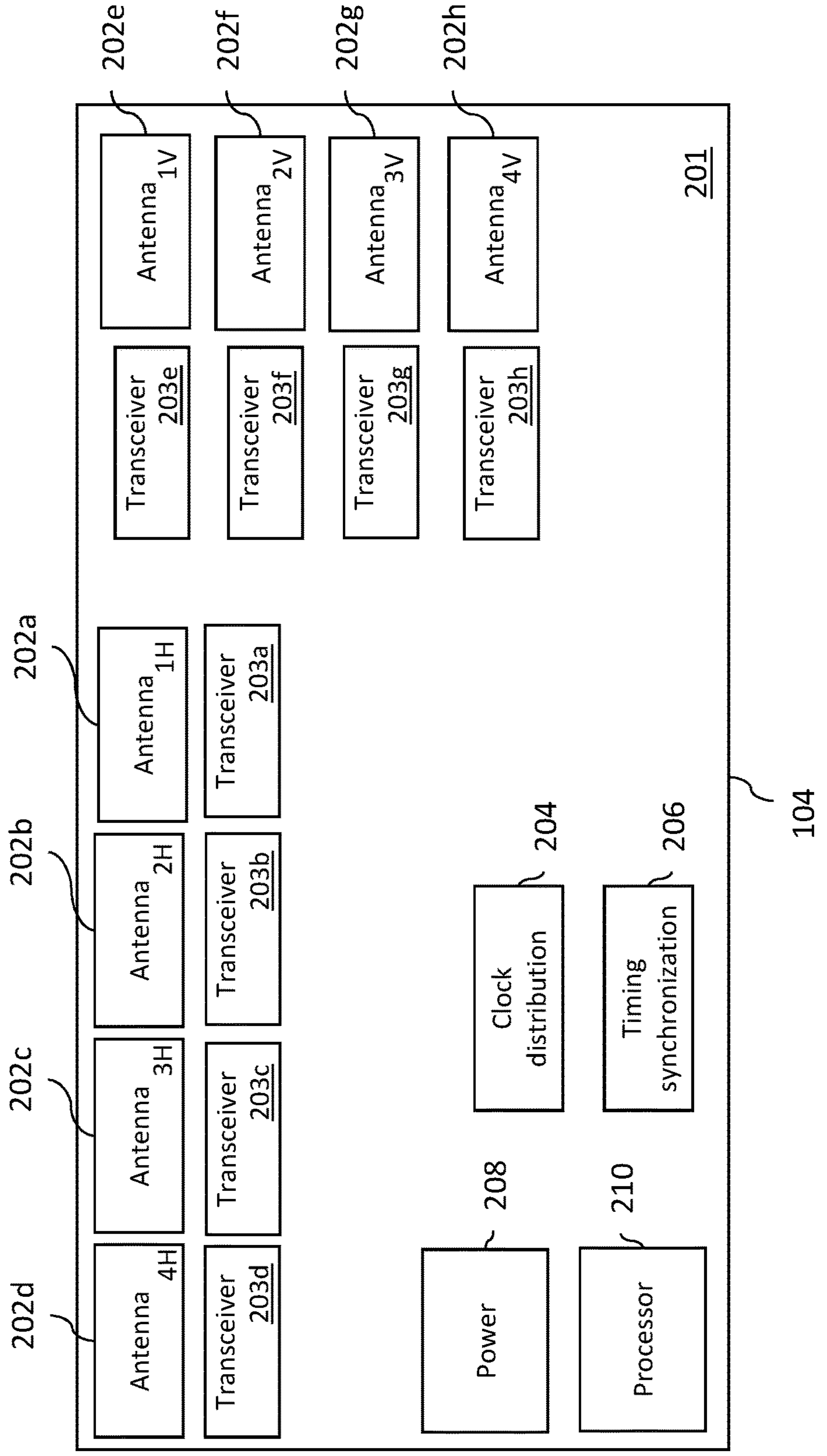
FIGS. 2*a-b* illustrate exemplary anchors, according to some implementations of the current subject matter.

To be able to determine location of the tag 102 using a single transmission, the anchor(s) 104 may be configured to execute a 3D angle of arrival (AoA) determination by each anchor 104 in the system 100. FIG. 2*a* illustrates an exemplary anchor 104, according to some implementations of the current subject matter. The anchor 104 may be configured to include a board (e.g., a printed circuit board) 201, one or more antennas 202 (a, b, c, d, e, f, g, h), a clock distribution component 204, a timing synchronization component 206, a power component 208, a processor component 210, and/or any other computing components. The antennas 202 may be configured to form an array and may be arranged in any desired fashion and with any a number of antennas (e.g., an L-shaped 2D 8-antenna array with 4 horizontal antennas (1H-4H) and 4 vertical antennas (1V-4V)). One or more of the components 202-210 may be coupled to each other to perform determinations of the angle of arrival of a signal transmitted by the tag 102 (not shown in FIG. 2*a*).

Figure 2B:
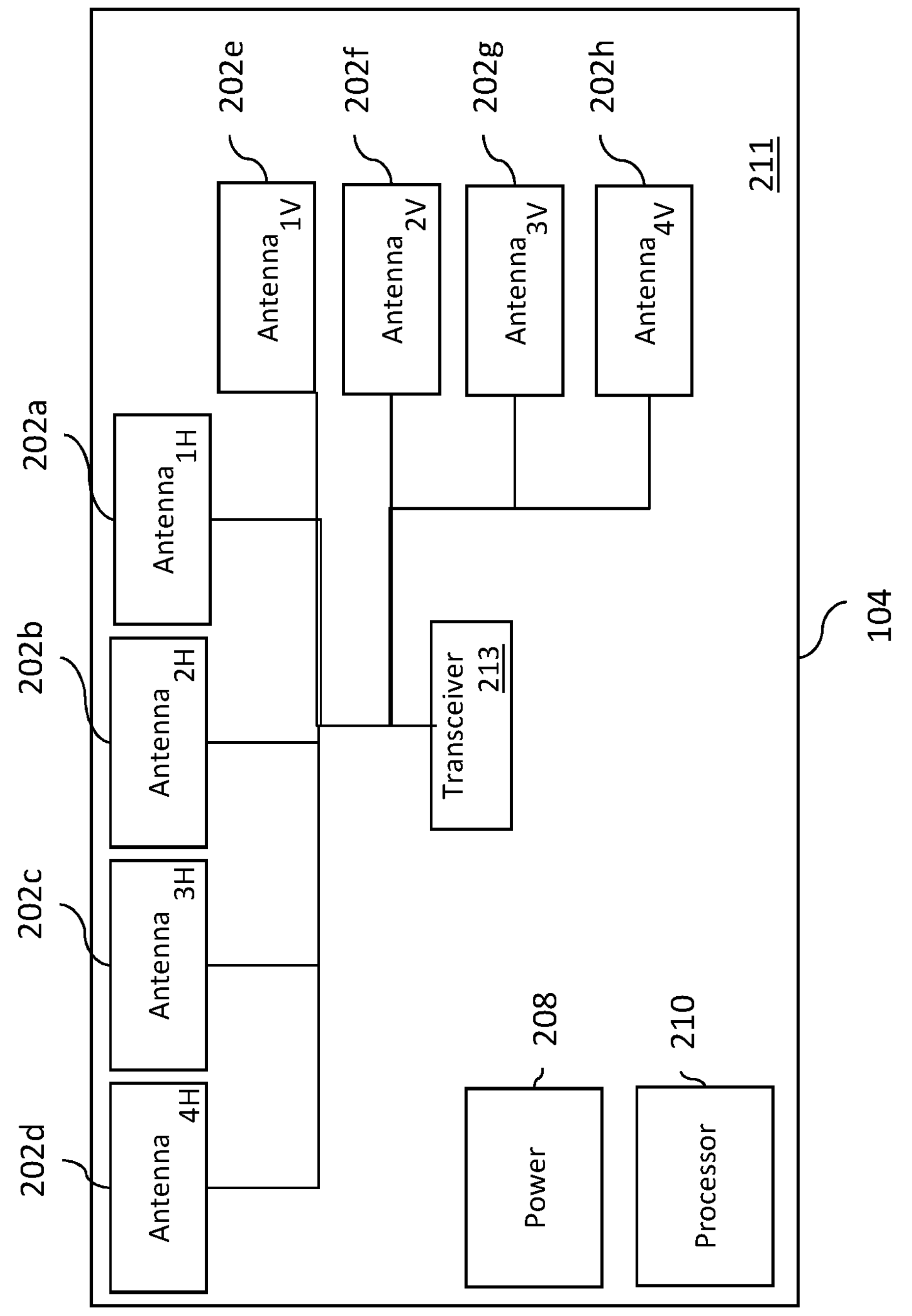

Each antenna 202 may be configured to be associated with a respective transceiver component 203 (a, b, . . . , h). Alternatively, one transceiver 203 may be used for communicating with one or more antennas 202. FIG. 2*b* illustrates an exemplary anchor 104 that may include a single transceiver 213 (similar to transceivers 203 shown in FIG. 2*a*) that may be connected to one or more antennas 202. Moreover, the transceiver 213 may be configured to incorporate clock distribution component 204 and the timing synchronization component 206 (as shown in FIG. 2*a*) and incorporate their functions. Further, to communicate with a particular antenna 202, the transceiver 213 may be configured to incorporate and/or be communicatively coupled to a switching component that may be used to switch connection of the transceiver 213 to a particular antenna 202. The switching component may also connect the transceiver 213 to multiple antennas 202 simultaneously (or one at a time).

Referring back to FIG. 2*a*, the transceivers 203 along with the antennas 202 may be used to measure a relative phase difference in the channel impulse response between all antennas 202 accurately. The antennas 202 may be synchronized in time, frequency, and phase either on the specific anchor 204 and/or across all or some of the anchors. The antennas 202 of a particular anchor 104 may be arranged in any desired fashion, Moreover, the antennas may be oriented in a predetermined fashion (i.e., polarization). For example, the antennas 202 may be oriented in the same direction and/or positioned at a predetermined distance from one another (e.g., 3.3 cm apart, e.g., half wavelength for the 4.4928-GHz channel, thereby providing the distance between the antennas to be less than half a wavelength necessary to achieve unique theta-phi estimates).

In some implementations, the transceivers 203 may be configured to communicate with the processor (e.g., a microcontroller unit (MCU)) 210 using one or more serial peripheral interface (SPI) buses (e.g., 20 MHz SPI buses). The controller 210 may be configured to select one or more transceiver-antenna sets to communicate with (e.g., in a round-robin fashion). The clock distribution and timing synchronization components 204, 206 may be used to synchronize carrier frequency and phase by feeding the same reference clock values (which may be predetermined) to all transceivers 203. In some implementations, an ultra-wideband transceiver (disposed on the board 201) may be configured to provide an additional SYNC signal input, which may be used to reset a timestamp in each transceiver 203 to ensure that the transceivers are aligned. The SYNC signal may be sampled at a rising edge of the reference clock signal. The processor 210 may be configured to ensure that the SYNC signal is asserted only during the falling edge of the reference clock, thereby providing a maximum clearance from rising edges of the clock. Thus, the anchor 104 may be configured to achieve the required time, frequency, and phase synchronization by driving the transceivers 203 from the same clock source and performing wired time-base synchronization on the board 201.

In some implementations, each of the anchors 104, using the hardware components discussed above (as well as processes discussed below), may be configured to determine 3D angles of arrival (AoA) and combine them to obtain an accurate 3D location of the tag 102 in real-time. As stated above, the antennas 202 may be arranged in a predetermined pattern (or any desired pattern), where each of the antennas 202 may be configured to simultaneously receive transmissions and/or each transmission (e.g., "blink") from the tag 102. The antennas 202 may be synchronized in time, frequency, and/or phase to perform an accurate 3D AoA determination by each anchor 104. To do so, the anchor 104 may include the clock distribution component 204 and the timing synchronization component 206.

Further, the current subject matter system 100 may be configured to execute a process (e.g., using processor 210 located on the anchor 104 and/or an external processor) for accurately determining a real-time localization of the tag 102 (e.g., using 3D AoA). The process uses time, frequency, and/or phase synchronized channel impulse responses (CIR) of the transmissions received from the tag 102 across one or more or all anchors 104 in the system 100 (shown in FIG. 1). The CIR estimates across all antennas 202 for a particular anchor 104 may be used determine 3D AoA by each anchor 104. In particular, the current subject matter's process executed by the system 100 may be configured to implement a high-sampling rate enabled first peak index (FPI) detection process. In some exemplary, non-limiting implementations, the FPI index may be accurate at least 1 nanosecond due to the high bandwidth of ultra-wideband systems, thereby enabling multipath-free 3D AoA estimation through use of fast 2D FFT processes. Further, to account for mobility of tags 102 and potential multipath issues, the current subject matter system 100, in addition to using FPI and 2D FFT processing, may be configured to execute a non-Gaussian temporal tracker for tag 102 location, thereby enabling the current subject matter system 100 to achieve low-power and cm-accurate 3D localization of tag 102 in real-time.

Through various experimentation, the current subject matter system 100 achieved a median (90th percentile) 3D localization error that's 1.8× (2.5×) smaller than conventional systems in stationary conditions. Further, in high mobility conditions, the system 100 achieved a median (90th percentile) error 3.1× (4.3×) smaller than conventional system (e.g., than existing systems that use TWR). Moreover, the system 100 also achieved a localization latency of 1 millisecond per tag 102 location, which is 13× lower than the conventional two-way ranging (TWR) systems, thereby making system 100 highly scalable. Additionally, the system 100 achieved this localization latency and accuracy with a minimal power consumption where, the system 100 consumed 31 micro Joules of energy for one tag location estimate, as compared to 286 micro Joules of energy per location estimate for conventional systems. Further, the system 100 was able to track multiple tags 102 in real-time without any loss in its accuracy.

Figure 3A:
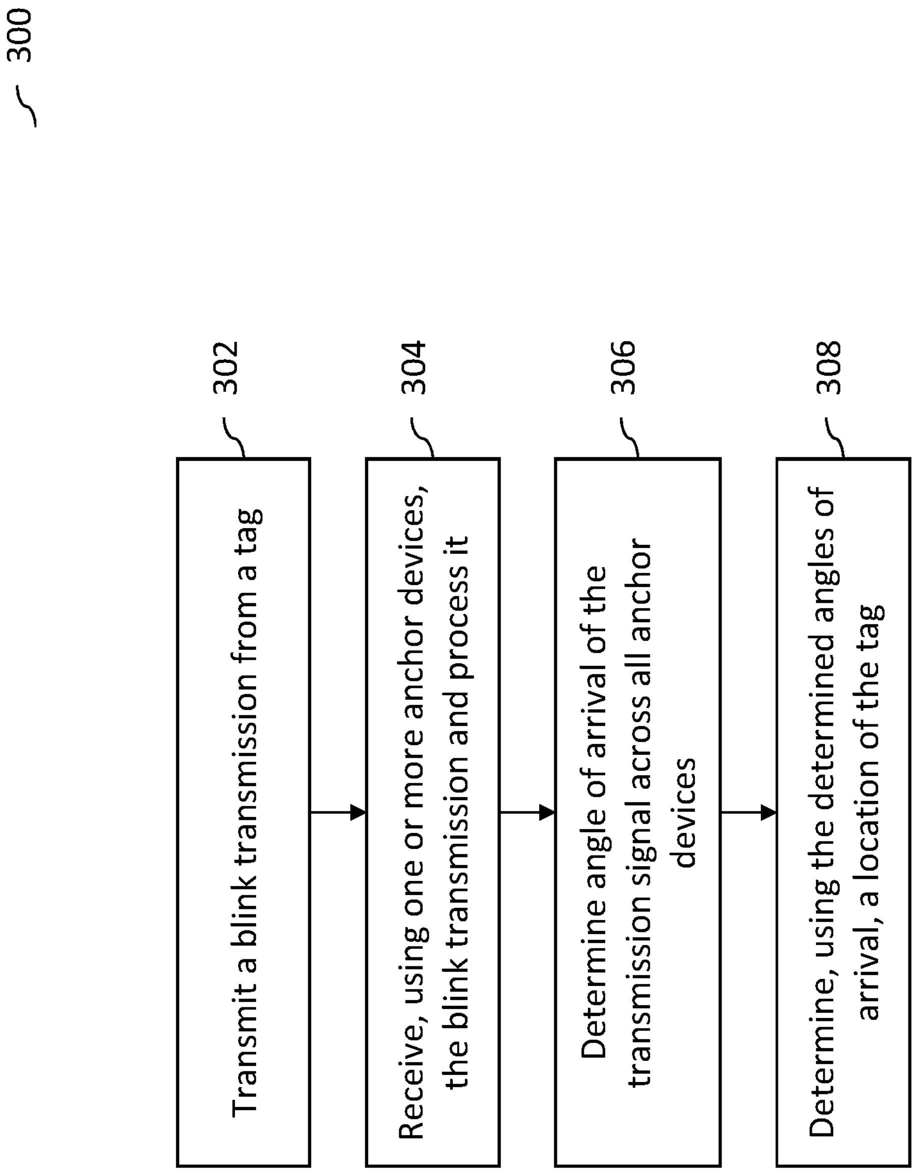
FIG. 3*a* illustrates an exemplary process for determining location of a tag (e.g., tag shown in FIG. 1), according to some implementations of the current subject matter.
Figure 3B:
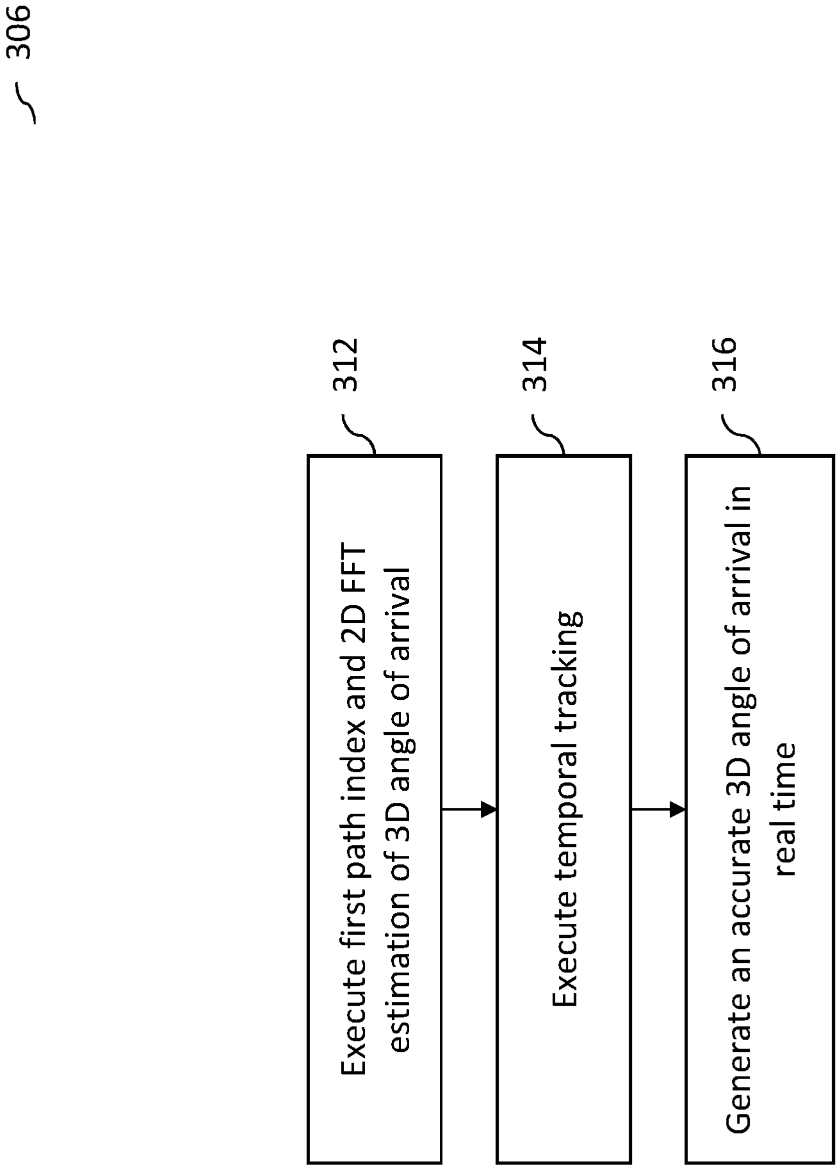
FIG. 3*b* illustrates a further detail of the process for determining a 3D accurate angle of arrival in real-time, according to some implementations of the current subject matter.

FIG. 3*a* illustrates an exemplary process 300 for determining location of a tag (e.g., tag 102 shown in FIG. 1), according to some implementations of the current subject matter. The process 300 may be performed by the system 100 shown in FIG. 1. At 302, one or more of the tags 102 may be configured to transmit a signal (e.g., a "blink" transmission) to one or more of the anchor devices 104 (as shown in FIG. 1). The transmission from the tag 102 may be a single transmission (e.g., multiple transmission might not be needed for accurate location determination). The anchor(s) 104 may be configured to receive the transmission from the tag 102, at 304. Once the transmission is received from the tag 102, the anchor(s) 104 may be configured to execute a determination of a 3D angle of arrival (e.g., an azimuth (θ) and polar (ϕ) angles of arrival (i.e., a 3D AoA)) across multiple anchors 104 in the system 100, at 306. FIG. 3*b* illustrates a further detail of the process 306 for determining a 3D accurate angle of arrival in real-time, according to some implementations of the current subject matter. Using the determined angle of arrival in real time, the system 100 may be configured to determine a location of the tag 102, at 308. The location of the tag 102 may be determined by the system 100 in real-time and to within a small distance (e.g., centimeter, millimeter, etc.).

In some implementations, the tag's blink transmission may be enabled without modifying UWB protocols as follows. For example, initially, if a transmission from the tag 102 is rejected, the tag 102 may initiate a standard protocol compliant repeated transmissions (e.g., blinks) to inform the system 100 (e.g., any of the anchors 104) of its presence in the system 100's environment. Upon discovery of the tag 102, the anchors 104 may transmit a Range-Init response, which may be typical of the UWB protocol. During the Range-Init transmission, the anchors 104 may program the tag to only transmit a blink at a periodic interval to enable accurate localization of the tag 102. Thus, the tag 102 may need to transmit only a single blink transmission to inform all anchors 104 to receive it and, thereby, locate it simultaneously. This also may avoid extra processing by the tag 102, thereby reducing power-consumption on the tag 102. Additionally, the blink interval may be modified based on a number of co-located tags 102 in the environment of the system 100 to avoid packet collision. The 3D AoA and the tag 102 location determination may be performed by the system 100, thereby further removing additional processing and computational complexity from the tag 102. Moreover, use of a single blink transmission-based protocol may allow the tag's power to last longer (e.g., up to 2.4 years, as compared to conventional systems (e.g., 3-4 months of existing TWR based systems). Additionally, as stated above, this protocol may allow for location update rate in real-time with a low latency (e.g., 1 msec) for each location of the tag 102.

Figure 6:
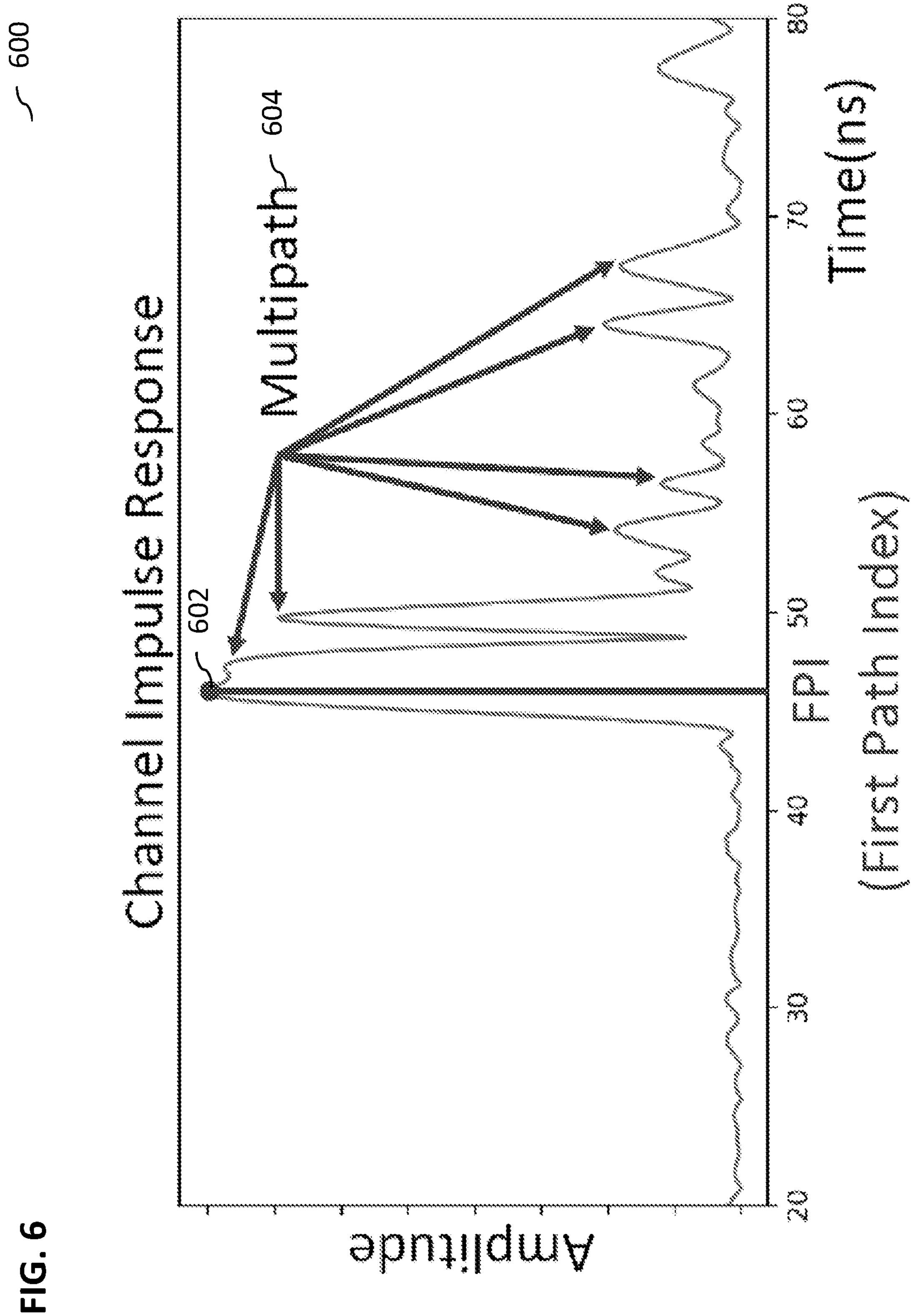
FIG. 6 illustrates an exemplary channel impulse response (signal amplitude vs. time) plot, according to some implementations of the current subject matter.

In some implementations, to accurately estimate location of the tag 102 using the process 306, shown in FIG. 3*b*, the system 100 may be configured to execute FFT-based algorithms, as discussed below. In particular, referring to FIG. 3*b*, the system 100 may perform estimation of a three-dimensional (3D) angle of arrival in real time, at 312. For this estimation, the system 100 may assume that during the FFT-based 3D AoA determination, the system 100 may extract a direct path's tap across all the antennas 202 (shown in FIGS. 2*a*-*b*) from a particular CIR information from each antenna 202 of each anchor 104. To obtain the direct path's tap across all antennas 202, a first path index (FPI), which is the direct path's index as the direct path travels the least amount of time, may be used. FIG. 6 illustrates an exemplary channel impulse response (signal amplitude vs. time) plot 600, according to some implementations of the current subject matter. A first path index may be represented by the first peak 602 (e.g., a strongest signal), whereas the remaining smaller peaks 604 occurring after the first peak may be indicative of a multipath signals (e.g., reflections, etc.). The FPI estimate provided by the antennas 202 may have a small resolution (e.g., up to 1 nanosecond). The FPI may provide a reasonable estimate of the direct path and thus, may be used with FFT-based 3D AoA estimation in real-time, as discussed below.

Figure 4A:
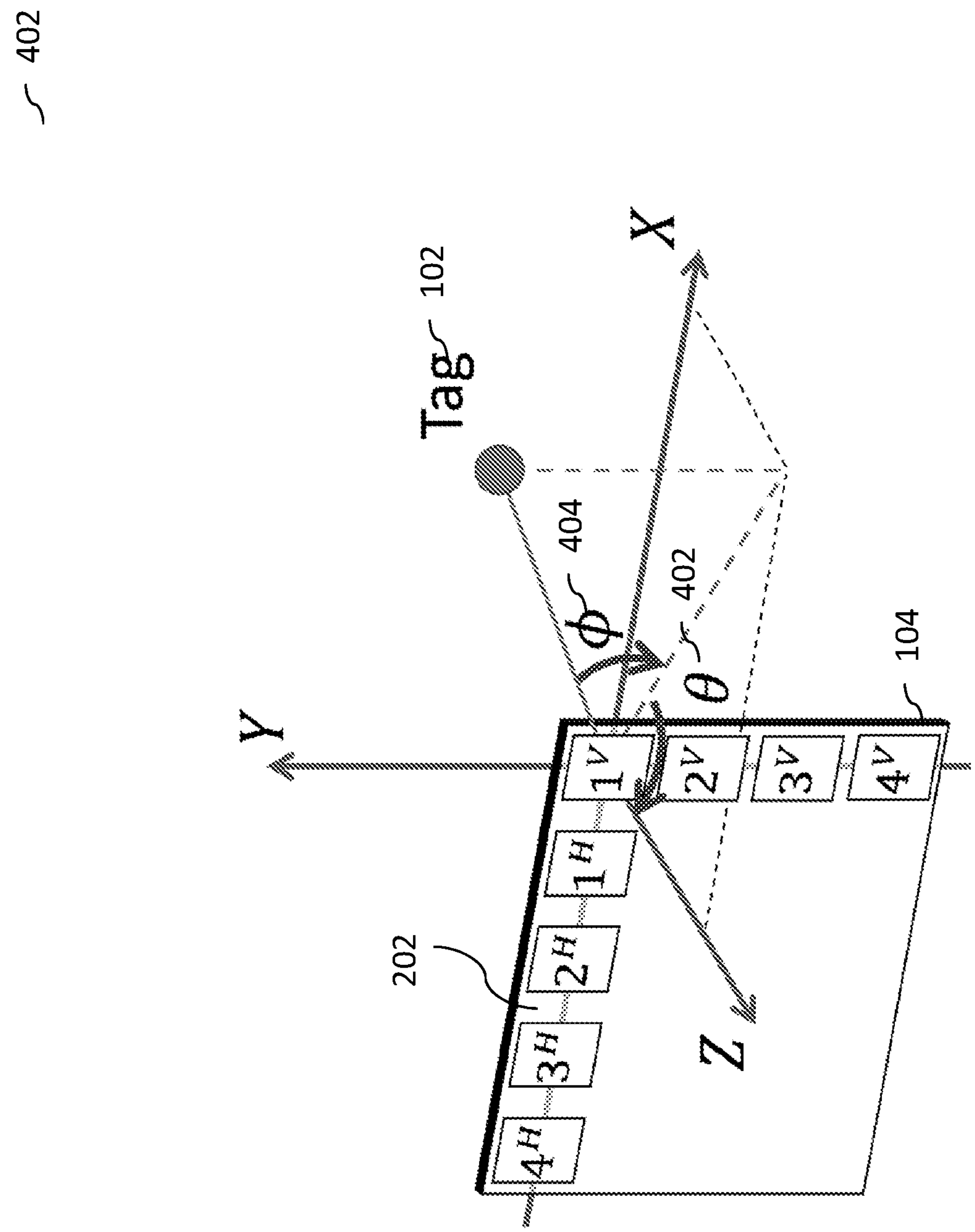
FIG. 4*a* is exemplary plot illustrating measurement of azimuth (θ) and polar (ϕ) angles of arrival of a signal from a tag by an anchor using its antennas, according to some implementations of the current subject matter.
Figure 4B:
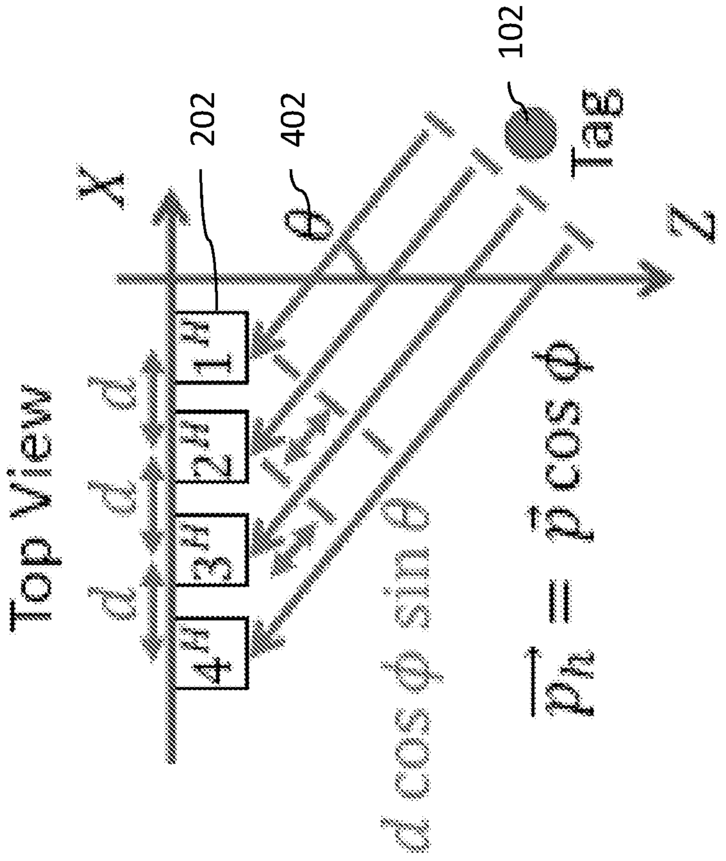
FIG. 4*b* is another exemplary plot illustrating measurement of azimuth (θ) and polar (ϕ) angles of arrival of a signal from a tag by an anchor using its antennas, according to some implementations of the current subject matter.
Figure 4C:
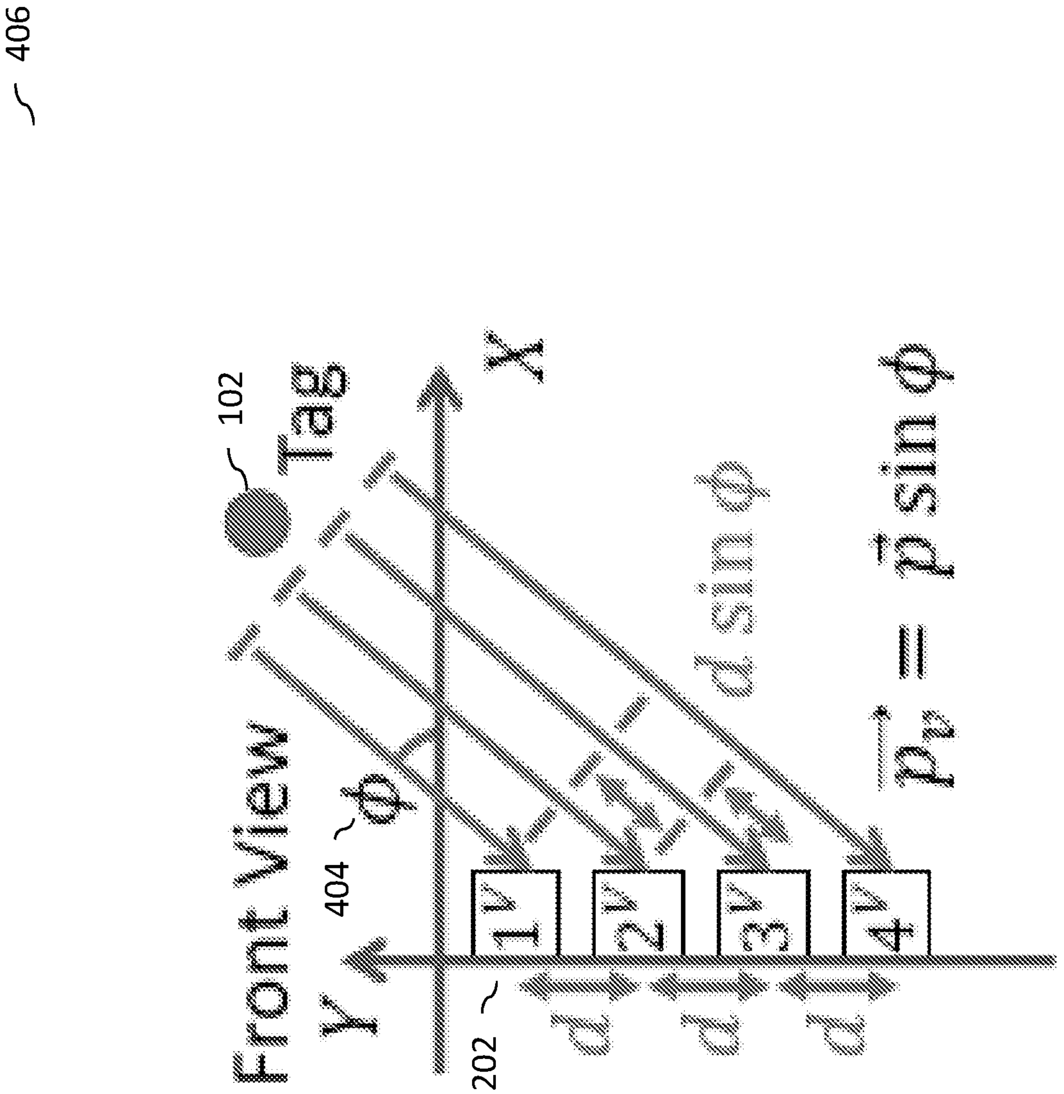
FIG. 4*c* is yet another exemplary plot illustrating measurement of azimuth (θ) and polar (ϕ) angles of arrival of a signal from a tag by an anchor using its antennas, according to some implementations of the current subject matter.

The system 100 may be determine a first path index and apply a 2D FFT to previously estimate an angle of arrival (at 312). FIGS. 4*a*-4*c* are exemplary plots 402-406, respectively, illustrating measurement of azimuth (θ) 402 and polar (ϕ) 404 angles of arrival of a signal from a tag 102 by an anchor 104 using its antennas 202, according to some implementations of the current subject matter. As shown in FIG. 4*a*, the antennas 202 may be arranged in a horizontal (1H-4H) and vertical (1V-4V) fashion. In particular, FIG. 4*b* illustrates an exemplary top view of the horizontal antennas (1H-4H) 202 for estimation of the azimuth angle 402 and FIG. 4*c* illustrates an exemplary front view of the vertical antennas (1V-4V) 202 for estimation of the polar angle 404. With reference to FIGS. 4*a*-*c*, an ideal channel impulse response (CIR), where n is the time-index, $h^v_i(n)$, for the ith antenna (∀i=1, 2 . . . , $N_{ant-v}$) on a vertical antenna array, and $h^h_j(n)$, for the jth antenna (∀j=1, 2 . . . , $N_{ant-h}$) on the horizontal antenna array, may be expressed as follows:

$$h_i^v(n) = a_i \exp\left(-\iota 2\pi f_c \frac{r + (i-1)d\sin\phi}{c}\right), \quad (1)$$
$$h_j^h(n) = a_j \exp\left(-\iota 2\pi f_c \frac{r + (j-1)d\sin\theta\cos\phi}{c}\right)$$

Equation (1) may be used for a tag 102 that may be located at distance r from the anchor 104 and transmitting at a central frequency $f_c$, where c is the speed of light, ι=√−1, and $a_i$, $a_j$ are the corresponding attenuation constants across the antennas 202. For a particular channel impulse response measurements on a particular antenna tap n, a simple transform, using equation (1), may be defined as follows $$P(\theta_k, \phi_l, n) = \left| \sum_{i=1}^{N_{ant-v}} h_i^v(n) = \exp\left(\iota 2\pi \frac{(i-1)d\sin\phi_l}{c}\right) + \sum_{j=1}^{N_{ant-h}} h_j^h(n)\exp\left(\iota 2\pi \frac{(j-1)d\sin\theta_k\cos\phi_l}{c}\right) \right| \quad (2)$$

where P($\theta_k$, $\phi_l$, n) is the likelihood at the direction of arrival of ($\theta_k$, $\phi_l$) corresponding to the time-index n, of the measured CIR. The above transform is a Fast Fourier transform. Further, due to the design of the antenna arrays, under no multi-path, there may be a unique solution for the actual direct path's 3D-AoA, (θ^, θ^) that may be expressed as follows $$\left(\theta^{UWB}, \phi^{UWB}\right) = \underset{\substack{-\pi/2\le\theta\le\pi/2 \\ -\pi/2\le\phi\le\pi/2}}{\arg\max}\ P(\theta, \phi) \quad (3)$$

Equation (3) assumes that θ∈[−π/2, π/2] and ϕ∈[−π/2, π/2], no carrier frequency offset, and d≤λ/2, where λ is the wavelength of the carrier frequency.

At 314, the system 100 may be configured to execute a temporal tracking process, as discussed below in connection with FIG. 5. At 316, the system 100 may generate an accurate 3D angle of arrival information, that may include azimuth and polar angles of arrival ($\theta^{UWB}$, $\phi^{UWB}$), for a particular tag 102. The generated 3D AoA ($\theta^{UWB}$, $\phi^{UWB}$) may be provided in real-time and may be more accurate than conventional systems estimates.

However, in some cases, multipath in a channel may cause corruption of the phase difference between some pairs of antennas 202, which may result in multiple ambiguous peaks in the theta-phi likelihood-map. To overcome phase distortion, the system 100 may be configured to execute the temporal tracking process 314 shown in FIG. 5, according to some implementations of the current subject matter. The process 314 may be configured to be executed by one or more anchors 104 and/or any other component of the system 100. During the process 314, the system may receive as input location information (or one or more likelihood location maps) of tags 102 across N anchors 104 (e.g., using Equation (2) above), then determine an accurate location (e.g., x, y, z, coordinates of a tag at a particular moment in time t).

Figure 5:
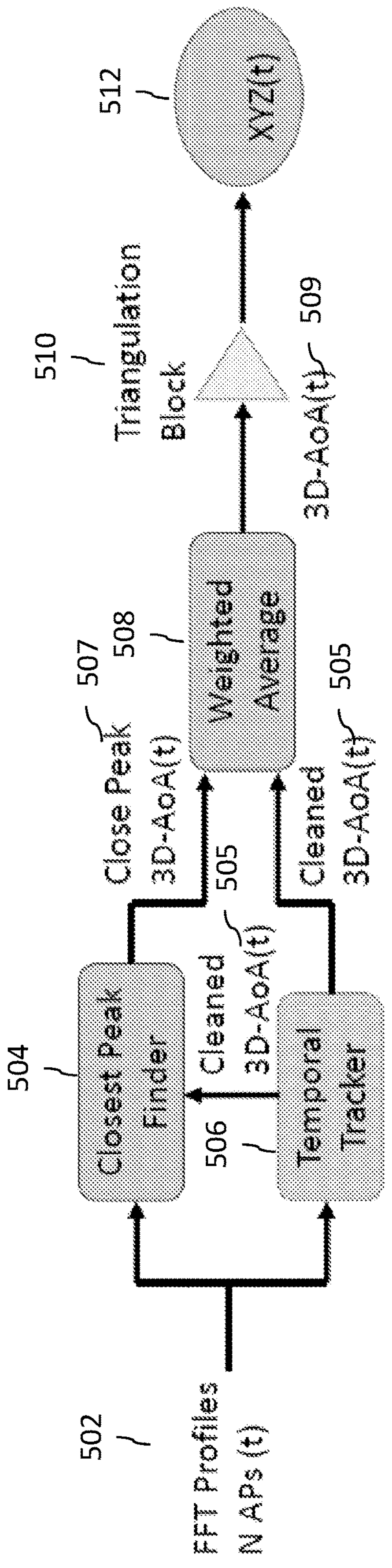
FIG. 5 illustrates an exemplary temporal tracking process, according to some implementations of the current subject matter.

As shown in FIG. 5, at 502, 2D FFT profiles, corresponding to signals received by each anchor (AP) 104 from tag 102, and determined by each anchor at a particular moment in time may be received. Equation (2) above may be used for determination of such profiles.

At 504, a closet peak corresponding to 3D AoA for each anchor-tag pair may be determined. Additionally, at 506, a temporal tracker process may be applied to the each of the 2D FFT profiles to generate a "cleaned" 3D AoA for each anchor-tag pair. The temporal tracker process may be configured to track the tag over-time by estimating the tag's velocity from one or more previous N (e.g., 7) estimates, and may use that information to predict the tag's next location, based on the optimized tag location from the previous temporal estimate. The system 100's temporal tracker may be configured to use a global maxima peak (as for example shown in FIG. 6) for the previous N time instances rather than an optimized prediction from the previous instances. This may be useful in situations where no good peak exists for an extended period of time and when previously optimized may rely on a low inertial cleaned prediction (e.g., the optimized prediction may drift off for an extended period of time in a direction the tag was last moving, which in turn, may cause disappearance of the correct peak).

To define the temporal tracker process, at 506, the system 100 may use maxima peaks derived at 312 (as shown in FIG. 3*b*) at time instances (t−n), n=1, 2, . . . , N (e.g., 7) for all the $N_{ap}$ anchors 104 in the system 100, i.e., ($\theta^{UWB}_{t-n}$, $\phi^{UWB}_{t-n}$). The maxima 3D x, y, and z positions of tag by performing trilateration (XYZ(t)), which may then be used to determine an estimate of an approximate velocity of the tag 102 $v_{temporal(t)}$. Using this velocity along with the previous instant's predicted location, $XYZ^{temporal(t-1)}$, the temporal tracker 506 may predict a location of the current instant $XYZ^{temporal\ (t)}$ of the tag 102 as $XYZ^{temporal(t-1)}+v_{temporal\ (t)}*\Delta t$, which may then be remapped to the 3D AoA estimates for all the $N_{ap}$ anchors in the system as ($\theta^{cleaned}_t$, $\phi^{cleaned}_t$) 505.

In addition to the temporal tracker, the system 100 may use the prediction of the temporal tracker 506 to estimate a closest peak to it amongst the peaks in the current profile, at 504. The process 314 may then determine a weighted average, at 508, of both the temporal tracker 3D AoA estimate ($\theta^{cleaned}_t$, $\phi^{cleaned}_t$) and the closest peak finder 3D AoA estimate ($\theta^{close}_t$, $\phi^{close}_t$) to determine an accurate real-time 3D AoA estimate 509, ($\theta^{ULoc}_t$, $\phi^{ULoc}_t$) These weights, $W_{reliability}(<1)$ may be used to determine a reliability of the current 3D AoA estimates of the temporal tracker ($\theta^{cleaned}_t$, $\phi^{cleaned}_t$) The weighting factor ($W_{reliability}$) may define an error distribution of each likelihood-map (e.g., possible locations of the tag 102), using weights (e.g., peaks, angular, and distance) to account for non-Gaussian 3D-AoA errors, where the corresponding weight coefficients ($w_{p,t}$, $w_{a,t}$, and $w_{d,t}$) may be averaged to determine a weighting factor. The three weights may include the following inputs: $\theta^{cleaned}$, $\theta^{close}$, and a number of peaks in the likelihood-map at time t. The first weight ($w_{p,t}$) may correspond to a number of peaks in the likelihood-map; the second weight ($w_{a,t}$) may account for erroneous 3D-AoA estimation following computations using Equation 2; and the third weight ($w_{d,t}$) may be used to compare the difference between $\theta^{cleaned}$ and $\theta^{close}$, whereby this weight may accounts for large instantaneous changes in the likelihood-map, particularly in disappearances of the correct peak.

Further to determine an accurate 3D-AoA, the temporal tracking process may include re-initialization of $\theta^{cleaned}_t$ to avoid erroneous 3D-AoA estimation. The $\theta^{cleaned}_t$ estimation may be re-initialized along with reliable $\theta^{close}_t$ set estimations. In some exemplary, non-limiting implementations, $\theta^{close}_t$ set estimation may be considered reliable when it is within ±60°, and the weighting factor is within 0.35 ($W_{reliability}$<=0.35). Under these conditions, $\theta^{cleaned}_t$ may be set to be the same as $\theta^{close}_t$, i.e., $\theta^{cleaned}_t=\theta^{close}_t$.

Subsequent to the triangulation, at 510, the location (i.e., XYZ(t)) of the tag 102 may be determined, at 512, using the following:

$$\theta^{ULoc}_{k,i} = W_{reliability}\theta^{cleaned}_{k,i} + (1 - W_{reliability})\theta^{close}_{k,t}: \quad (4)$$

$$\theta^{ULoc}_{k,t} = W_{reliability}\phi^{cleaned}_{k,t} + (1 - W_{reliability})\phi^{close}_{k,t}$$

$$\text{where, } W_{reliability} = \frac{(w_{d,i} + w_{p,i} + w_{a,t})}{3} \in [0, 1]$$

where $\theta^{ULoc}_{k,t}$ is the final theta estimation for anchor k∈{1, 2, . . . , $N_{anchor}$} at time index, t. Thus, the system 100 may be configured to achieve an accurate real-time 3D AoA estimate from a single anchor 104.

Referring back to FIG. 3*b*, at 316, an accurate real-time 3D localization of the tag 102 may be generated. For a multi-anchor setup, as for example, is shown in FIG. 1, the anchors 104 do not need to perform any TWR measurements, and, instead, may be configured to execute a triangulation algorithm using accurately tracked 3D AoA estimates ($\hat{\theta}_k$, $\hat{\phi}_k$) from multiple anchors 104 (∀k=1, 2, . . . , $N_{anchor}$), where a line $l_k$ may be defined starting with the anchor's 104 location, $x_k$ in the direction of ($\hat{\theta}_k$, $\hat{\phi}_k$) as follows:

$$l_k \equiv p_k = x_k + t\vec{v}_k \quad (5)$$

where, $p_k$ is any point along the line $l_k$ for a given translation of t away from the known point on the line, $x_k$, and $\vec{v}_k$=[sin ($\hat{\phi}_k$), cos ($\hat{\phi}_k$) sin ($\hat{\theta}_k$), cos ($\hat{\phi}_k$) cos ($\hat{\theta}_k$)] is the unit vector defined in the direction defined by ($\hat{\theta}_k$, $\hat{\phi}_k$). With this definition of the line, $l_k$, the location of the tag 102 $x_{tag}$ may be determined using the following:

$$x_{tag} = \underset{x}{\operatorname{argmin}} \sum_{k=1}^{N_{ap}} (x_k - x)^T \left(I - \vec{v_k}\vec{v_k}^T\right)(x_k - x) \quad (6)$$

where I may be an 3×3 identity matrix. Using this formulation, the system 100 may perform much faster accurate 3D localization that is at least 20× faster than a conventional TWR based localization algorithm.

The generalized 3D AoA estimation algorithm that may be used for any random 2D antenna arrays 202 whose relative antenna positions with respect to the first antenna may be expressed as $$\left(d_i^{AP'}, \theta_i^{AP}, \phi_i^{AP}\right)$$

for each i=2, 3, . . . , $N_{ant}$ antennas, where $$\left(d_i^{AP}, \theta_i^{AP}, \phi_i^{AP}\right)$$

are the distance, azimuth (e.g., measured with respect to positive z-axis), and polar angles (e.g., measured with respect to XZ-plane) of the $i^{th}$ antenna with respect to the first antenna, and the likelihood profile may be estimated for the FPI tap on vertical and horizontal axes, $h^v_i(0)$, $h^h_i(0)$ across each of the $i^{th}$ antenna may be expressed as follows:

$$P(\theta_k, \phi_l) = \left| \sum_{i=1}^{N_{ant-v}} h_i^v(0) = \exp\left(\iota 2\pi \frac{(i-1)d_i^{AP}\sin\left(\phi_l + \phi_i^{AP}\right)}{c}\right) + \sum_{i=1}^{N_{ant-v}} h_i^v(0)\exp\left(\iota 2\pi \frac{(i-1)d_i^{AP}\sin\left(\theta_l + \theta_i^{AP}\right)\cos\left(\phi_l + \phi_i^{AP}\right)}{c}\right) \right| \quad (7)$$

Further, in systems where only one anchor 104 is deployed, the 3D AoA estimation may be used to determine tag's location at time instance, t, using standard spherical to Cartesian transforms as follows.

$$x_t^{UWB} = -r_t^{UWB}\cos\left(\phi_t^{UWB}\right)\sin\left(\theta_t^{UWB}\right) \quad (8)$$

$$y_t^{UWB} = -r_t^{UWB}\sin\left(\phi_t^{UWB}\right)$$

$$z_t^{UWB} = r_t^{UWB}\cos\left(\phi_t^{UWB}\right)\cos\left(\theta_t^{UWB}\right)$$

FIG. 7 illustrates an exemplary performance comparison table 700 comparing performances of conventional systems to the performance of the current subject matter system 100.

In particular, the table 700 compares accuracy, tag estimated battery life, infrastructure-driven characteristics, and latency parameters of four conventional systems (TWR-based system, a system implementing TWR and AoA processes, concurrent ranging system, and concurrent AoA determination system) and the system 100 (shown in FIG. 1).

As can be seen from the table 700, the system 100 is capable of achieving a centimeter-accurate location of a tag in three-dimensional space. The lifespan of tag's battery using system 100 may be approximately 2.4 years. As discussed above, the system 100 relies on its infrastructure (i.e., anchors, processors, rather than tags). Lastly, the system has very low latency associated with communication and localization processes (e.g., approximately 1 msec). Conventional systems are clearly deficient when compared to the system 100's performance.

Figure 8:
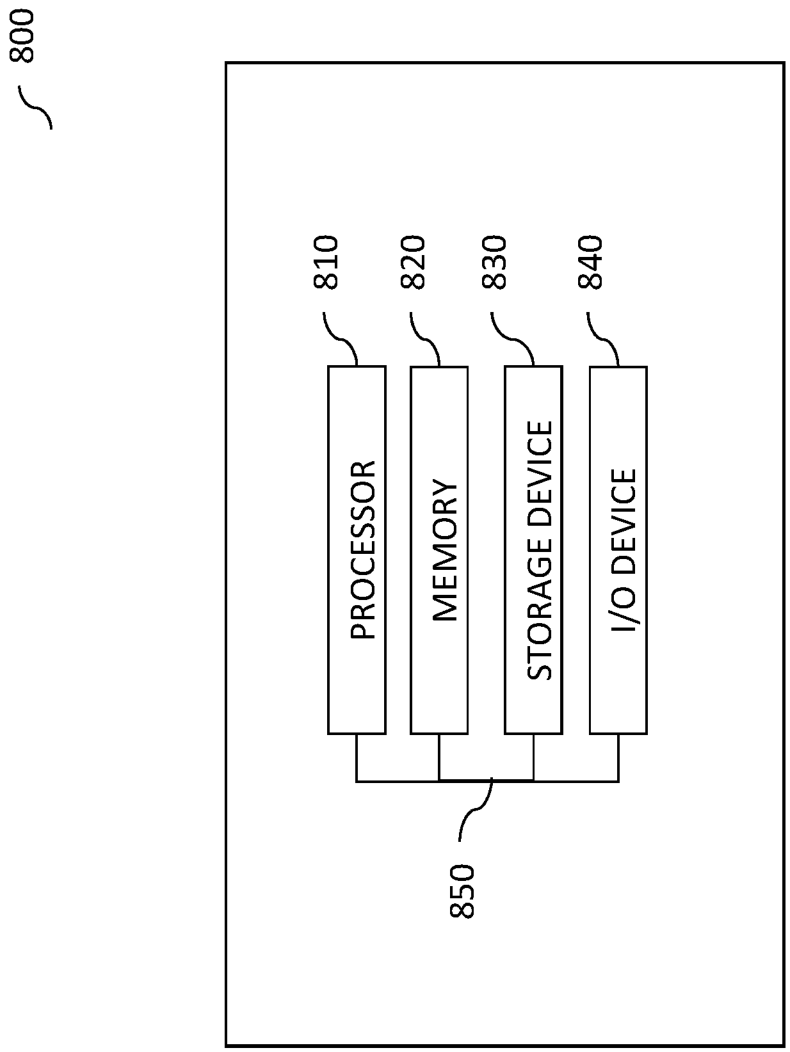
FIG. 8 illustrates an exemplary system, according to some implementations of the current subject matter.

In some implementations, the current subject matter can be configured to be implemented in a system 800, as shown in FIG. 8. The system 800 can include a processor 810, a memory 820, a storage device 830, and an input/output device 840. Each of the components 810, 820, 830 and 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
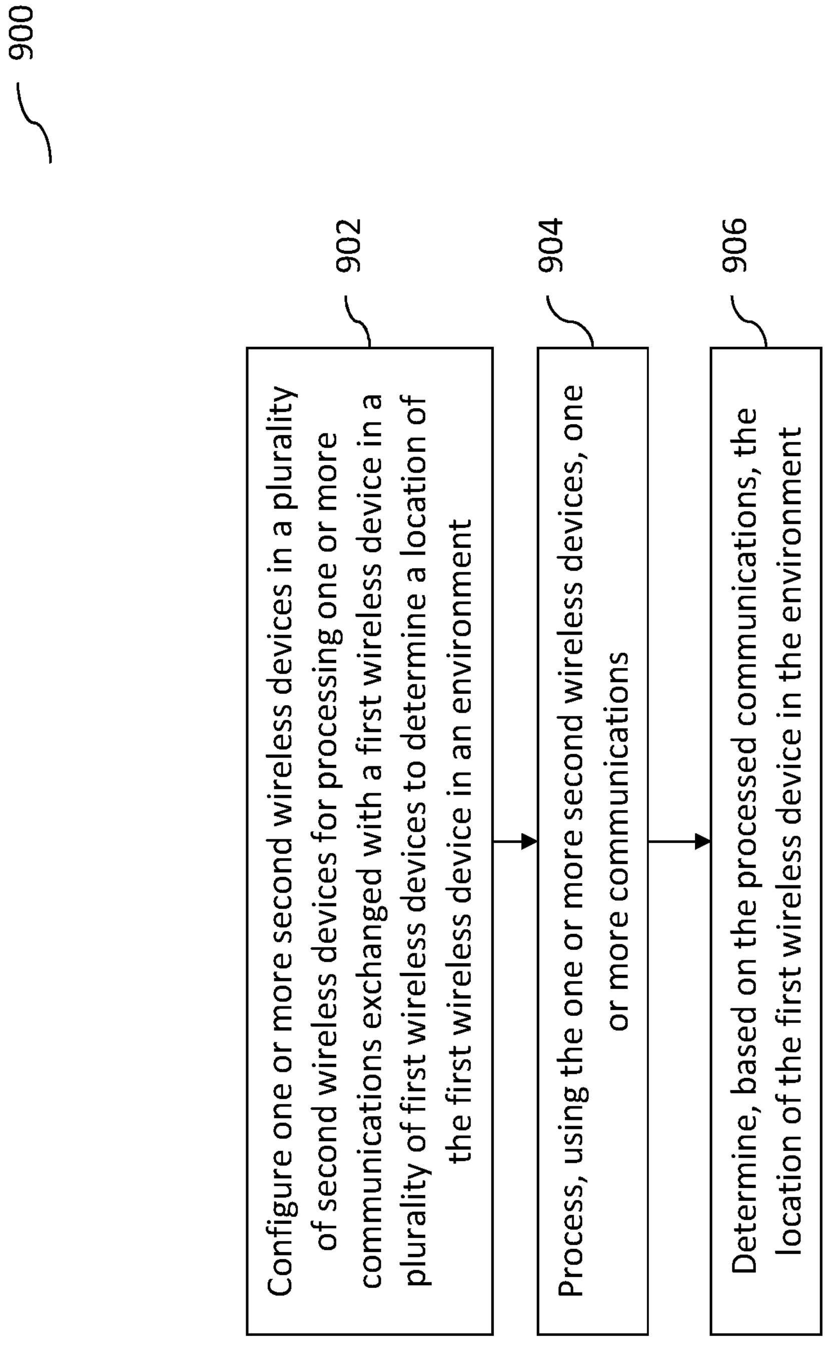
FIG. 9 illustrates an exemplary method, according to some implementations of the current subject matter

FIG. 9 illustrates an exemplary method 900 for determining a location of a device (e.g., a wireless tag 102 in a system 100 environment (which may include a wireless communication environment, a wired communication environment, a physical setting environment (e.g., an anchor 104 and a tag 102 separated by a physical barrier, etc.), and/or any other type of environment), according to some implementations of the current subject matter. The method 900 may be executed by the system 100 shown in FIG. 1 upon receiving appropriate data related to signal transmissions between one or more tags 102 and one or more anchor communication devices 104 (as shown in FIG. 1). Both devices 102 and 104 may be wireless devices.

At 902, one or more second wireless devices (e.g., an anchor as shown in FIG. 1) may be configured to process one or more communications (e.g., a signal transmission) that may be exchanged with a first wireless device (e.g., a tag 102 as shown in FIG. 1). The communications may include transmissions to and/or from the first wireless device. One or more of such communications may be exchanged. Such communications may be used to determine a location of the tag in an environment, e.g., system 100 environment. The signal may include a blink transmission, for example.

At 904, each anchor device 104 may be configured to process the communications. For example, the anchor 104 may be configured to determine an angle of arrival of the signal transmission. The determination of the angle of arrival may involve estimation of the angle of arrival (includes one or more of its components, e.g., azimuth, polar angles of arrival, etc.), application of first path index and 2D FFT processing to the estimates across all antennas in the anchor device 104, and determining an accurate angle of arrival of the signal transmission, as discussed above with regard to FIGS. 3*a*-*b*. The determinations may be performed in real-time for each transmission received by the anchor device 104.

At 906, a location of the first wireless device in the environment may be determined based on the processed communications. The accurate angle of arrival information may be used by the processing equipment of the anchor devices 104 to determine an accurate location of the tag 102 in the environment of the system 100. Such determination may be performed in accordance with the operations of processes shown in FIGS. 3*a*-5 and discussed above.

In some implementations, the current subject matter may include one or more of the following optional features. The communications may include at least one of: a received communication, a transmitted communication, and any combination thereof by at least one of: the first wireless device, one or more second wireless devices, and any combination thereof. Further, the communications may include a communication responsive to at least one of: the received communication, the transmitted communication, and any combination thereof. Additionally, the communications may include a signal transmission. Moreover, as stated above, the processing of the communications may include determining, based on the signal transmission, an angle of arrival of the signal transmission, and determining, using the determined angle of arrival of the signal transmission, the location of the first wireless device in the environment.

The signal transmission may be received using one or more second wireless devices (e.g., anchors 104) in a plurality of second wireless devices. Each second wireless device in the plurality of second wireless devices may include one or more antennas (e.g., antennas 202 which may include transceivers 203 shown in FIG. 2*a*) configured to receive the signal transmission from the first wireless device and/or transmit at least another signal to the first wireless device.

In some implementations, each antenna may be configured to be synchronized using at least one clock reference signal. The clock reference signals may be generated using at least one processor of a second wireless device in the plurality of wireless devices receiving the signal transmission.

In some implementations, each antenna may be configured to be positioned a predetermined distance from another antenna in the one or more antennas. Such exemplary, non-limiting positioning is illustrated in FIGS. 2*a*-*b*. Further, each antenna may be configured to be oriented in a predetermined direction.

In some implementations, the antennas of each second wireless device in the plurality of second wireless devices may be configured to be synchronized using at least one of the following parameters: a time, a frequency, a phase, and any combination thereof.

In some implementations, at least one of the first and second wireless devices may be configured to be ultra-wideband wireless devices. The signal transmission may be an ultra-wideband signal transmission. In some implementations, the signal transmission may include a blink transmission.

In some implementations, the determining of the angle of arrival of the signal transmission may include estimating at least one of an azimuth angle of arrival and a polar angle of arrival for each antenna, combining estimated azimuth angles of arrival and polar angles of arrival for one or more antennas, and determining, based on the combined estimates of azimuth angles of arrival and polar angles of arrival for one or more antennas, an actual angle of arrival of the signal transmission.

In some implementations, the determining the actual angle of arrival of the signal transmission may be performed in real-time. The determined location of the first wireless device in the environment may correspond to the location of the first wireless device in a multi-dimensional space at a predetermined point in time.

In some implementations, the first wireless device may include at least one of a stationary first wireless device, a moving wireless device, and any combination thereof.

In some implementations, the determination of the location of the first wireless devices may include determining the location of the first wireless device using a single second wireless device in the plurality of second wireless devices by executing a two-way-ranging communication protocol at one or more antennas of the single second wireless device. Further, the determination of the location of the first wireless device may include determining the location of the first wireless device using at least one of the following: at least one of one or more azimuth angles, one or more polar angles, and any combination thereof associated with the signal transmission received by at least two or more of the second wireless devices in the plurality of second wireless devices; at least one of one or more azimuth angles, one or more polar angles, one or more values resulting from execution of the two-way-ranging communication protocol, and any combination thereof by at least one or more of the second wireless devices in the plurality of second wireless devices; and any combination thereof.

In some implementations, the current subject matter relates to an apparatus (e.g., for determination of a location of a wireless device (e.g., tag 102)). The apparatus (e.g., as shown in FIGS. 1-2) may include one or more antennas configured to be positioned a predetermined distance from at least another antenna in the one or more antennas, one or more transceivers communicatively coupled to one or more antennas, and at least one processing device communicatively coupled to one or more transceivers. The processing devices may be configured to process one or more communications received by one or more transceivers, and determine a location of at least one wireless device in an environment based on one or more processed communications.

In some implementations, the current subject matter may include one or more of the following optional features. One or more communications may include a signal transmission. The processing devices may be configured to determine, based on the signal transmission, an angle of arrival of the signal transmission, and determine, using the determined angle of arrival of the signal transmission, the location of the wireless device in the environment. One or more antennas may be configured to receive the signal transmission from the wireless device and/or transmit at least another signal to the wireless device.

In some implementations, each antenna may be configured to be synchronized using at most one clock reference signal, the clock reference signal being generated by the at least one processing device. Each antenna may be further configured to be oriented in a predetermined direction. One or more antennas may be configured to be synchronized using at least one of the following parameters: a time, a frequency, a phase, and any combination thereof.

In some implementations, the signal transmission is an ultra-wideband signal transmission. Moreover, the signal transmission may include a blink transmission.

In some implementations, at least one processing device may determine the angle of arrival of the signal transmission by estimating at least one of an azimuth angle of arrival and a polar angle of arrival for each antenna, combining estimated azimuth angles of arrival and polar angles of arrival for one or more antennas, and determining, based on the combined estimates of azimuth angles of arrival and polar angles of arrival for one or more antennas, an actual angle of arrival of the signal transmission. Further, the determination of the actual angle of arrival of the signal transmission may be performed in real-time. The determined location of the wireless device in the environment may correspond to the location of the wireless device in a multi-dimensional space at a predetermined point in time.

In some implementations, the wireless device may include at least one of: a stationary wireless device, a moving wireless device, and any combination thereof.

In some implementations, the determination of the location of the wireless device may include executing a two-way-ranging communication protocol at one or more antennas. Further, the determination of the location of the wireless device may include determining the location of the wireless device using at least one of the following: at least one of one or more azimuth angles, one or more polar angles, and any combination thereof associated with the signal transmission; at least one of one or more azimuth angles, one or more polar angles, one or more values resulting from execution of the two-way-ranging communication protocol, and any combination thereof; and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:

configuring one or more second wireless devices in a plurality of second wireless devices for processing one or more communications exchanged with a first wireless device in a plurality of first wireless devices to determine a location of the first wireless device in an environment, wherein the one or more communications comprise a received communication from the first wireless device, wherein the received communication comprises an ultra-wideband signal configured as an ultra-wideband blink signal transmission, wherein the ultra-wideband blink signal transmission comprises a single ultrawideband broadcast transmission from the first wireless device and receivable by the plurality of the second wireless devices, and wherein the single ultrawideband broadcast transmission is transmitted by the first wireless device without requiring receipt of a response at the first wireless device for determining the location of the first wireless device in the environment;

processing, using the one or more second wireless devices, the one or more communications comprising the ultra-wideband blink signal transmission, wherein the processing further comprises determining, based on at least the ultra-wideband blink signal transmission and using a first path index of a channel impulse response and a two-dimensional fast Fourier transform, an azimuth angle of arrival of the ultra-wideband signal transmission and a polar angle of arrival of the ultra-wideband signal transmission; and determining, using the azimuth angle of arrival of the ultra-wideband blink signal transmission and the polar angle of arrival of the ultra-wideband signal transmission, the location of the first wireless device in the environment.

2. The method according to claim 1, wherein the one or more communications further include a transmitted communication by at least the one or more second wireless devices.

3. The method according to claim 2, wherein the one or more communications include a communication responsive to at least one of: the received communication, the transmitted communication, and any combination thereof.

4. The method according to claim 1, wherein each second wireless device in the plurality of second wireless devices includes one or more antennas configured to receive at least the ultra-wideband signal configured as the ultra-wideband blink signal transmission from the first wireless device and/or transmit at least another signal to the first wireless device.

5. The method according to claim 4, wherein the one or more antennas of each second wireless device is configured to be communicatively coupled to one or more transceivers of each second wireless device.

6. The method according to claim 5, wherein each transceiver in the one or more transceivers is configured to be synchronized using at most one clock reference signal, the clock reference signal being generated using at least one processor of a second wireless device in the plurality of second wireless devices processing the ultra-wideband blink signal transmission.

7. The method according to claim 5, wherein the one or more transceivers of each second wireless device in the plurality of second wireless devices are configured to be synchronized using at least one of a time, a frequency, a phase, and any combination thereof.

8. The method according to claim 4, wherein each antenna in the one or more antennas is configured to be positioned a predetermined distance from another antenna in the one or more antennas.

9. The method according to claim 8, wherein each antenna in the one or more antennas is configured to be oriented in a predetermined direction.

10. The method according to claim 4, wherein the determining of the azimuth angle of arrival and the polar angle of arrival includes estimating the azimuth angle of arrival and the polar angle of arrival for each antenna in the one or more antennas.

11. The method according to claim 10, wherein the determining of the azimuth angle of arrival and the polar angle of arrival is based on a single ultra-wideband blink signal transmission from the first wireless device, wherein the determining further includes combining estimated azimuth angles of arrival and polar angles of arrival for the one or more antennas; and determining, based on the combined estimates of azimuth angles of arrival and polar angles of arrival for the one or more antennas, an actual angle of arrival of the ultra-wideband blink signal transmission.

12. The method according to claim 11, wherein the determining the actual angle of arrival of the ultra-wideband blink signal transmission is performed in real-time.

13. The method according to claim 12, wherein the determined location of the first wireless device in the environment corresponds to the location of the first wireless device in a multi-dimensional space at a predetermined point in time.

14. The method according to claim 4, wherein the determining the location of the first wireless device further comprises determining the location of the first wireless device using a single second wireless device in the plurality of second wireless devices by executing a two-way-ranging communication protocol at one or more antennas of the single second wireless device.

15. The method according to claim 14, wherein the determining the location of the first wireless device further comprises determining the location of the first wireless device using at least one of:

at least one of one or more azimuth angles, one or more polar angles, and any combination thereof associated with the ultra-wideband blink signal transmission received by at least two of the plurality of second wireless devices in the plurality of second wireless devices;

at least one of one or more azimuth angles, one or more polar angles, one or more values resulting from execution of the two-way-ranging communication protocol, and any combination thereof by at least one or more of the second wireless devices in the plurality of second wireless devices; and any combination thereof.

16. The method according to claim 1, wherein at least one of the first and second wireless devices are configured to be ultra-wideband wireless devices.

17. The method according to claim 1, wherein the first wireless device includes at least one of: a stationary first wireless device, a moving first wireless device, and any combination thereof.

* * * * *